United States Patent [19]

Harris et al.

[11] 4,088,811
[45] May 9, 1978

[54] 1,4-CYCLOHEXADIENE COMPOUNDS USED AS CHAIN TRANSFER AGENTS IN NITRILE POLYMERIZATION

[75] Inventors: Alva F. Harris, Wilbraham; Maximino S. Azevedo, Springfield, both of Mass.

[73] Assignee: Monsanto Company, St. Louis, Mo.

[21] Appl. No.: 736,838

[22] Filed: Oct. 29, 1976

[51] Int. Cl.² .................... C08F 20/42; C08F 20/44
[52] U.S. Cl. .................. 526/89; 526/292; 526/317; 526/341; 526/342
[58] Field of Search ................ 526/89, 292, 317, 341, 526/342

[56] References Cited

U.S. PATENT DOCUMENTS 3,265,677  8/1966  Delacratez et al. ............... 526/341

OTHER PUBLICATIONS

Greenberg et al., Chem. Abs. 64 (1966), p. 8456f.
Grinninger, Chem. Abs. 72 (1970), p. 112513n.
Komatsu et al., Chem. Abs. 81 (1974), p. 79113t.
Inomata et al., Chem. Abs. 83 (1975), p. 80281u.

*Primary Examiner*—Harry Wong, Jr.
*Attorney, Agent, or Firm*—Michael J. Murphy

[57] ABSTRACT

Nitrile polymers are prepared in a polymerization reaction wherein 1, 4 cyclohexadiene or a selected derivative thereof is used as a chain transfer agent.

18 Claims, No Drawings

1,4-CYCLOHEXADIENE COMPOUNDS USED AS CHAIN TRANSFER AGENTS IN NITRILE POLYMERIZATION

BACKGROUND OF THE INVENTION

This invention relates to an improved process for the preparation of nitrile polymers wherein 1,4-cyclohexadiene or a selected derivative thereof is used as chain transfer agent. More particularly, this invention involves the polymerizaion of nitrile polymers having improved color by using as chain transfer agent a cyclohexa-1,4-diene derivative having the formula:

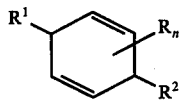

wherein $R^1$ and $R^2$ each independently represent hydrogen or an alkyl group of 1 to 4 carbon atoms and each R independently represents an alkyl group of 1 to 4 carbon atoms or one or two pairs of R groups together may represent one or two fused benzo groups and n is an integer of 0 to 4.

The tendency of certain free radical polymerizable materials to polymerize to very high molecular weight polymers under normal polymerization conditions is already well known. These very high molecular weight polymers generally have the disadvantage of being difficult to process and often require the use of special processing equipment or temperatures so high as to have a detrimental effect on the strength and color of the processed polymer.

Different techniques have been proposed for regulating the molecular weights of such polymers so as to make them more easily processable. For example, the polymerization temperature may be raised, but this increases the danger of runaway polymerization. Another technique involves conducting the polymerization in an organic diluent but while effective as a means of lowering molecular weight, it has disadvantages of increased cost and inconvenience of separating the polymer from the organic diluent. Still another technique involves the use of a chain transfer agent or molecular weight regulator. A variety of chain transfer agents have been used with varying effectiveness. For example, mercaptans; terpenes such as terpinolene and dipentene; cyclo-olefins such as cyclohexene, 1-methylcyclohexene-1 and 1,2 carboxy-5-methylcyclohexene-4; Eugenol, etc. have all been used as chain transfer agents.

In receent years it has been discovered that certain polymeric nitrile polymers particularly those having a high proportionate amount of olefinic nitrile component are especially suitable for packaging and other applications because of their excellent water and oxygen barrier properties. In the polymerization of such polymers the necessity for molecular weight control is evident but the development of undesirable color in the polymers during processing is a serious problem.

SUMMARY OF THE INVENTION

It has now been found in accordance with the method of this invention that the use of selected cyclohexa-1,4-diene derivatives are particularly efficient as chain transfer agents in polymerization of high nitrile polymers and surprisingly and unexpectedly, the resulting polymers have improved color characteristics. Additionally, it was found that the use of such derivatives generally result in the reduction of the amount of catalyst or initiator required in the polymerization reaction. More particularly, this invention provides a process for the polymerization of a nitrile composition in the presence of a free radical generating initiator and an effective amount of a cyclohexa-1,4-diene compound as chain transfer agent and having the formula:

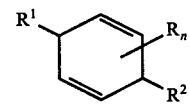

wherein $R^1$ and $R^2$ each independently represent hydrogen or an alkyl group of 1 to 4 carbon atoms; each R independently represents an alkyl group of 1 to 4 carbon atoms or one or two pairs of R groups taken together may represent a fused benzo group; and n is an integer of 0 to 4; said composition comprising at least about 20% by weight of a nitrile monomer having the formula:

$$CH_2=C-CN$$
$$\mid$$
$$R^3$$

wherein $R^3$ is hydrogen, an alkyl group having from 1 to 4 carbon atoms or halogen; and one or more ethylenically unsaturated copolymerizable monomer materials.

DETAILED DESCRIPTION OF THE INVENTION

The improved process of this invention is carried out by conducting the polymerization of a nitrile composition in the presence of a cyclohexa-1,4-diene compound having the formula:

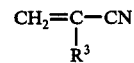 (I)

wherein $R^1$ and $R^2$ each independently represent hydrogen or an alkyl group of 1 to 4 carbon atoms, preferably 1 to 2 carbons and each R independently represents an alkyl group of 1 to 4 and preferably 1 to 2 carbon atoms or one or two pairs of R groups taken together may represent one or two fused benzo groups, and n is an integer of 0 to 4. Particularly preferred is the compound (I) wherein $R^1$ and $R^2$ are hydrogen and n is 0.

Illustrative cyclohexa-1,4-diene compounds of the type defined by formula I include: 1, 4 cyclohexadiene; 1-ethyl-1,4-cyclohexadiene; 1-methyl-4-isopropyl-1,4-cyclohexadiene; 9, 10 dihydroanthracene and 1, 4 dihydronapthalene. Particularly preferred in the method of this invention is 1, 4 cyclohexadiene.

The amount of chain transfer agent or molecular weight regulator, i.e. cyclohexa-1,4 diene compound (I) employed in the practice of this invention will be a relatively minor but effective amount and generally will be in the range of from about 0.05 to about 5% by weight on the total weight of nitrile monomer composition, (i.e. total weight of monomers charged) and preferably from about 0.1 to about 1% by weight and more preferably from about 0.2 to about 0.4% by weight.

Compounds of the type defined by formula I may be prepared by known techniques such as the cathodic reduction of benzene illustrated by Japanese Pat. No. 48-35063 (1973) and U.S. Pat. No. 3,488,266, issued January 6, 1970.

The nitrile polymer composition prepared in the process of this invention generally contains at least about 20% by weight of an olefinically unsaturated mononitrile based on the total polymer weight and having the formula:

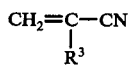

wherein $R^3$ is hydrogen, an alkyl group having 1 to 4 carbon atoms or an halogen. Such compounds include acrylonitrile, methacrylonitrile, ethacrylonitrile, propioacrylonitrile, alpha chloroacrylonitrile, etc. The most preferred olefinically unsaturated nitriles are acrylonitrile and methacrylonitrile and mixtures thereof.

The nitrile composition of this invention generally will contain one or more comonomer materials copolymerizable with the olefinically unsaturated nitriles and including:

(a) the monovinylidene aromatic hydrocarbon monomers of the formula:

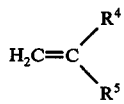

wherein $R^4$ is hydrogen, chlorine or methyl and $R^5$ is an aryl group of 6 to 10 carbon atoms and may also contain substituents such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g. ethylene, propylene, isobutylene, butene-1, pentene-1 and their halogen and aliphatic substituted derivatives, e.g. vinyl chloride, vinylidene chloride, etc.

(c) acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc.

Other comonomers which may be used in this invention include:

(d) vinyl esters of the formula:

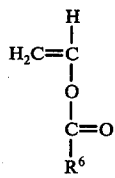

wherein $R^6$ is hydrogen, an alkyl group of from 1 to 10 carbon atoms, an aryl group of 6 to 10 carbon atoms, e.g. vinyl formate, vinyl acetate, vinyl propionate, vinyl benzoate, etc.

(e) vinyl ether monomers of the formula:

wherein $R^7$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon or oxygen — containing, i.e. an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

Additional comonomers useful in the practice of this invention are those comonomers which contain a mono- or di-nitrile function. Examples of these include methylene glutaronitrile, 2, 4-dicyanobutene-1, vinylidene cyanide, crotonitrile, fumaronitrile, maleonitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred is styrene and alpha methylstyrene. Another preferred composition is that wherein a terpolymer of nitrile, styrene and vinyl ether is used such as disclosed in U.S. Pat. No. 3,863,014, issued Jan. 28, 1975.

The amount of comonomer, as defined above, which is present in the nitrile composition can vary up to about 80% by weight based on the total weight of the nitrile polymer composition. Preferably, the nitrile composition will contain from about 50 to 90% by weight of nitrile monomer components and from about 10 to about 50% by weight of comonomer and more preferably from about 55 to about 85% by weight of nitrile monomer and from about 15 to about 45% by weight of comonomer all based on the total polymer weight.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen packaging materials prepared from this invention. This rubber component may be incorporated into the nitrile containing polymer by any of the methods which are well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The polymerization of the nitrile polymer composition in the presence of the cyclohexa-1,4-diene compound as defined herein may be accomplished by any of the mass, suspension or emulsion polymerization techniques conventionally employed, usually at temperatures in the range of about 30°–200° C at atmospheric, subatmospheric or superatmospheric pressure. The reaction mixture should contain a free radical polymerization initiator, such as a peroxy or azo compound, a persulfate and any ingredients required in the particular polymerization technique employed, e.g. water, an emulsifying agent, a suspending agent, etc. Optional ingredients, such as antioxidants and plasticizers can also be included in the reaction mixture if desired.

The nitrile polymer compositions prepared in accordance with the process of this invention have improved color properties making them particularly useful in packaging applications. The desirable barrier properties of such compositions also add to their attractiveness in packaging applications for foods, medicines, cosmetics and a variety of other products.

The following examples are given in illustration of the invention and should not be construed as limitations thereof.

EXAMPLE I

A one-half gallon reaction vessel was charged with 91 parts of water, 74.6 parts of acrylonitrile, 2.8 parts of styrene, 0.19 part of azobisisobutyronitrile, 0.09 part of 1,4-cyclohexadiene as chain transfer agent, one part of sodium chloride, 0.1 part of di-t-butyl-p-cresol, 0.075 part of an acrylic acid/2-ethylhexyl acrylate (95:5 mole %) copolymer and 0.075 part of polyvinyl alcohol/vinyl acetate (70:30 weight %) copolymer. This charge was deoxygenated under inert gas pressure for 5.5 hours at a temperature increasing from about 70° to about 90° C. During the polymerization, a charge of 22.7 parts of styrene, 0.19 part of 1,4-cyclohexadiene and 0.09 part of azobisisobutyronitrile was continuously added. At the end of the heating cycle, the batch was transferred to a stripper wherein unreacted monomers were distilled from the product which was then cooled, dewatered, washed and dried.

The resulting polymer had a content of 71.1% by weight of acrylonitrile at a conversion level of 86.7%. The specific viscosity of the polymer was determined to be 0.074.

The polymer was then extruded in a 1 inch Killion extruder with 2 stage screw at a stock temperature of 435° F to form pellets which were then molded in a one ounce Arburg molding machine at 425° F. Measurements were taken to determine three point yellowness (3PY) on an Arburg molded chip (3 inch × 4 inch × 0.100 inch) using a General-Electric Diano-Hardy recording spectrophotometer. Reflectance readings R, were made at 420, 500 and 700 millimicrons (m μ) and the numbers inserted into the following formula to arrive at the 3PY value for the molded sample:

$$3PY = 2R_{700} - R_{500} - R_{420}$$

the results indicated a 3PY value of 84 for the prepared sample.

For comparison purposes, a similar composition as described above was prepared using the same equipment and procedure and 0.45 part of terpinolene as chain transfer agent and 0.3 part of azobisisobutyronitrile as catalyst. The resulting polymer had a content of 68.6% by weight of acrylonitrile at a conversion level of 83.6% and a specific viscosity of 0.077. The 3PY value determined on a molded sample of this polymer was 111. This indicates that the polymer product prepared using the 1,4-cyclohexadiene compound of this invention had a significantly improved color as measured by 3PY over that prepared using a different chain transfer agent having a somewhat similar structure, i.e. terpinolene.

EXAMPLE II

A similar composition as described in Example I was prepared using the same equipment and procedure and 0.39 part of 1-ethyl-1,4-cyclohexadiene as chain transfer agent and 0.26 part of azobisisobutyronitrile as catalyst. The resulting polymer had a content of 69.5% acrylonitrile, at a conversion level of 83.7% and a specific viscosity of 0.067. The 3PY determined on a molded sample of this polymer was 89.8.

EXAMPLE III

A similar composition as described in Example I was prepared using the same equipment and procedure and 0.75 part of 9,10-dihydroanthracene as chain transfer agent and 0.26 part of azobisisobutyronitrile as catalyst. The resulting polymer had a content of 71.4% acrylonitrile at a conversion level of 87.3% and a specific viscosity of 0.087. The 3PY value determined on a molded sample of this polymer was 93.7.

EXAMPLE IV

A similar composition as described in Example I was prepared using the same equipment and procedure and 0.28 part of 1,4-cyclohexadiene as chain transfer agent and 0.24 part of azobisisobutyronitrile as catalyst. The resulting polymer had a content of 69.6% acrylonitrile at a conversion level of 83.5% and a specific viscosity of 0.080. The 3PY determined on a molded sample of this polymer was 95.

EXAMPLE V

A one gallon reaction vessel was charged with 91 parts of water, 74.6 parts of acrylonitrile, 2.8 parts of styrene, 0.16 part of azobisisobutyronitrile, 0.09 part of 1,4-cyclohexadiene as chain transfer agent, one part of sodium chloride, 0.1 part of di-t-butyl-p-cresol, 0.05 part of an acrylic acid/2-ethylhexyl acrylate (95:5 mole %) copolymer and 0.05 part of polyvinyl alcohol/vinyl acetate (70:30 weight %) copolymer. This charge was deoxygenated under inert gas pressure for 5.5 hours at a temperature increasing from about 70° to about 90° C. During the polymerization, a charge of 22.7 parts of styrene, 0.17 part of 1,4-cyclohexadiene and 0.08 part of azobisisobutyronitrile was continuously added. At the end of the heating cycle the batch was transferred to a stripper wherein unreacted monomers were distilled from the product which was then cooled, dewatered, washed and dried.

The resulting polymer had a content of 70.5% by weight of acrylonitrile at a conversion level of 85.2%. The specific viscosity of the prepared polymer was found to be 0.081. A molded sample of this polymer was prepared as in Example I and the 3PY determined as described in that Example and found to be 88.4.

The yellowness index (YI) was determined on a molded sample of the polymer using the standard test procedure ASTM D-1925-70 and found to be 25.1.

For comparison purposes, a similar composition as described above was prepared using the same equipment and procedure and 0.45 part of terpinolene as chain transfer agent and 0.3 part of azobisisobutyronitrile as catalyst. The resulting polymer had a content of 69.5% by weight of acrylonitrile at a conversion level 83.4% and a specific viscosity of 0.080. The 3PY value for this sample was 105 and the YI was 37.4. This indicates the polymer product prepared using 1,4-cyclohexadiene had a significantly improved color on both measurements over that polymer prepared using a different chain transfer agent having a somewhat similar structure, i.e. terpinolene.

EXAMPLE VI

A similar composition as described in Example V using the same equipment and procedure and 0.48 part of 1-methyl-4-isopropyl-1,4-cyclohexadiene (gamma terpinene) as chain transfer agent and 0.22 part of azobisisobutyronitrile as catalyst. The resulting polymer had a content of 70.1% by weight of acrylonitrile at a conversion level of 85% and a specific viscosity of 0.079. The 3PY value was found to be 87.6 and the YI was found to be 29.2 on a molded sample of this polymer.

The results of these examples by comparison show the products prepared using the cyclohexa-1,4-diene compounds of this invention had a significantly improved color as measured by 3PY and YI over that prepared using a different chain transfer agent having a somewhat similar structure (i.e. terpinolene).

What is claimed is:

1. In the process of the polymerization, in the presence of a free radical generating initiator, of a nitrile composition comprising at least about 20% by weight, based on the total polymer weight, of a nitrile monomer having the formula:

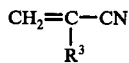

where $R^3$ is hydrogen, an alkyl group of 1 to 4 carbon atoms or halogen; and one or more ethylenically unsaturated copolymerizable comonomer materials, the improvement which comprises conducting the polymerization in the presence of an effective amount of a molecular weight regulator consisting of a cyclohexa-1,4-diene compound having the formula:

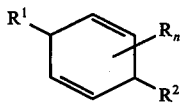

wherein $R^1$ and $R^2$ each independently represent hydrogen or an alkyl group of 1 to 4 carbon atoms; each R independently represents an alkyl group of 1 to 4 carbon atoms, or one of two pairs of R groups taken together may represent one or two fused benzo groups; and n is an integer of 0 to 4.

2. The process of claim 1 wherein said cyclohexa-1,4-diene compound is present in an amount of from about 0.05 to about 5% by weight based on the total weight of monomer composition.

3. The process of claim 2 wherein said comonomer material is selected from the group consisting of:
   (i) monovinylidene aromatic hydrocarbon monomers of the formula:

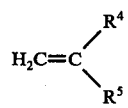

wherein $R^4$ is hydrogen, chlorine or methyl and $R^5$ is an aryl group of 6 to 10 carbon atoms;
   (ii) lower alpha olefins of from 2 to 8 carbon atoms; and
   (iii) acrylic acid and methacrylic acid and the corresponding acrylate and methacrylate alkyl esters wherein the alkyl group contains 1 to 4 carbon atoms.

4. The process of claim 3 wherein in said cyclohexa-1,4-diene compound, $R^1$ and $R^2$ are hydrogen.

5. The process of claim 4 wherein said cyclohexa-1,4-diene compound is selected from the group consisting of 1,4-cyclohexadiene, 1 ethyl-1,4-cyclohexadiene, 1-methyl-4-isopropyl-1,4-cyclohexadiene and 9,10-dihydroanthracene.

6. The process of claim 5 wherein said cyclohexa-1,4-diene is 1,4-cyclohexadiene.

7. The process of claim 1 wherein said nitrile composition comprises from about 50 to about 90% by weight of said nitrile monomer and from about 10 to about 50% by weight of said comonomer materials.

8. The process of claim 7 wherein said nitrile monomer is acrylonitrile.

9. The process of claim 8 wherein said cyclohexa-1,4-diene compound is 1,4 cyclohexadiene.

10. The process of claim 8 wherein said comonomer is styrene.

11. The process of claim 10 wherein in said cyclohexa-1,4-diene compound, $R^1$ and $R^2$ are hydrogen.

12. The process of claim 11 wherein said cyclohexa-1,4-diene compound is selected from the group consisting of 1,4-cyclohexadiene, 1-ethyl-1,4-cyclohexadiene, 1-methyl-4-isopropyl -1,4-cyclohexadiene and 9,10-dihydroanthracene.

13. The process of claim 10 wherein said cyclohexa-1,4-diene compound is 1,4-cyclohexadiene.

14. The process of claim 13 wherein said 1,4-cyclohexadiene is present in an amount of from about 0.1 to about 1% by weight based on the total weight of monomer composition.

15. The process of claim 14 wherein said nitrile composition comprises from about 55 to about 85% by weight of acrylonitrile and from about 10 to about 50% by weight of styrene.

16. The process of claim 15 wherein said 1,4-cyclohexadiene is present in an amount of from about 0.2 to about 0.4% by weight based on the total weight of monomer composition.

17. The process of claim 1 wherein the free radical generating initiator is selected from the group consisting of peroxy, azo or persulfate compounds and mixtures thereof.

18. The process of claim 1 wherein the molecular weight regulator is 1-methyl-4-isopropyl-1,4 cyclohexadiene.

* * * * *